United States Patent
Kuribayashi et al.

(10) Patent No.: US 6,194,665 B1
(45) Date of Patent: *Feb. 27, 2001

(54) FILM DISTINGUISHED IN CORIONA RESISTANT CHARACTERISTIC AND INSULATED WIRES, COILS AND MOTORS COMPRISING THE FILM AS AN INSULATION MATERIAL

(75) Inventors: Eiichirou Kuribayashi; Keigo Nishida; Yoshihide Ohnari, all of Otsu (JP)

(73) Assignee: Kanegafuchi Kagaku Kogyo Kabushiki, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,660

(22) Filed: Oct. 25, 1996

Related U.S. Application Data

(63) Continuation-in-part of application No. PCT/JP96/00456, filed on Feb. 27, 1996.

(30) Foreign Application Priority Data

Feb. 28, 1995 (JP) ........................................ PCT/JP95/00310

(51) Int. Cl.$^7$ ...................................................... H01B 7/34
(52) U.S. Cl. ................................ 174/120 R; 174/126.4; 174/127; 174/137 A; 428/379; 428/389
(58) Field of Search ........................ 174/110 R, 110 SR, 174/110 N, 120 R, 120 SR, 127, 126.4, 137 A, 138 C, 179, 209; 428/379, 380, 383, 384, 389

(56) References Cited

U.S. PATENT DOCUMENTS

| | | | |
|---|---|---|---|
| 3,244,800 | * 4/1966 | McLaughlin et al. | 174/120 R |
| 3,660,592 | * 5/1972 | Anderson | 174/110 SR X |
| 4,227,234 | * 10/1980 | Seanor et al. | 361/229 |
| 4,546,041 | * 10/1985 | Keane et al. | 174/100 SR X |
| 4,797,325 | * 1/1989 | Verdin et al. | 428/473.5 |
| 5,061,554 | * 10/1991 | Hjortsberg et al. | 174/110 N X |
| 5,340,649 | * 8/1994 | Roeker et al. | 428/344 |
| 5,622,769 | * 4/1997 | Kozuka et al. | 174/137 A X |
| 5,660,917 | * 8/1997 | Fujimori et al. | 428/195 |
| 5,677,051 | * 10/1997 | Shimoda et al. | 174/126.4 X |

FOREIGN PATENT DOCUMENTS

| | | |
|---|---|---|
| 50-66534 | 6/1975 | (JP) . |
| 58-18724 | 4/1983 | (JP) . |
| 62-26906 | 6/1987 | (JP) . |
| 4-122783 | 4/1992 | (JP) . |
| 4-323232 | 11/1992 | (JP) . |
| 5-230234 | 9/1993 | (JP) . |
| 6-108400 | 4/1994 | (JP) . |
| 7-171938 | 7/1995 | (JP) . |

OTHER PUBLICATIONS

Hawley, "Condensed Chemical Dictionary", p. 833, 1981.*
"Condensed Chemical Dictionary" Hawley, pp. 919, 920 and 922, 1981.*

* cited by examiner

*Primary Examiner*—Hyung-Sub Sough
*Assistant Examiner*—Chau N. Nguyen
(74) *Attorney, Agent, or Firm*—Pillsbury Madison & Sutro Intellectual Property Group

(57) ABSTRACT

A plastic film distinguished in corona resistant characteristic having a low cost without a low mechanical strength, which plastic film is particularly suitable for making insulated wires, coils, and electric motors capable of fully responding to demands for providing electric trains with higher running speeds and higher acceleration and deceleration. In accordance with one embodiment, the film includes a base layer and at least one thermally conductive layer having a minimum thermal conductivity of 2 W/m·K, preferably 6 W/m·K, more preferably 15 W/m·K laminated horizontally on at least one surface of the base layer. In accordance with another embodiment, the film has a minimum volume electrical resistivity of $10^{14}$ Ω·cm, preferably $10^{15}$ Ω·cm, and includes a base layer and at least one low-electrical-resistance layer having a maximum superficial electrical resistance of $10^{13}$ Ω·cm, preferably $10^{12}$ Ω·CM. The thermally conductive layer is preferably formed from at least one inorganic compound or inorganic material selected from the group consisting of metal nitrides, metal carbides, metal silicides, and metal oxides.

22 Claims, 4 Drawing Sheets

FILM DISTINGUISHED IN CORIONA RESISTANT CHARACTERISTIC AND INSULATED WIRES, COILS AND MOTORS COMPRISING THE FILM AS AN INSULATION MATERIAL

This is a CIP of PCT/JP96/00456, filed Feb. 27,1996.

FIELD OF THE INVENTION

The present invention relates to a film distinguished in corona resistant characteristic and insulated wires, coils and motors which respectively comprising said film as an insulation material. More particularly, the invention relates to a plastic film which contains improved corona resistant characteristic and is capable of satisfying severe demand in relation to the utilization of alternate current for driving motors of electric trains in recent years. The present invention also relates to the following fabricated by using said film: an insulation system which is fabricated by using said film and capable of responding to the needs for running rolling stocks at a higher speed with higher acceleration and deceleration, insulated wires used for composing parts of motors, and coils. The invention also relates to motors fabricated by using said coils, particularly such motors being mounted on rolling stocks and driven by high-voltage current.

BACKGROUND OF ART

There is a growing demand for achieving running of rolling stocks at a higher speed with higher acceleration/ deceleration. Materialization of increased capacity and down-sized lighter-weight structure is constantly demanded for main motors. Greater capacity and down-sized lighter-weight structure of main motors have been promoted by simplification of structure, improvement of performance characteristic of magnetic material and also via inprovement of thermal and voltage resistant characteristics of insulation materials. In particular, materialization of greater capacity and down-sized lighter weight structures subsequent to debut of truck-mounted main motors replacing suspension-type main motors owes much to development of insulation technology. A variety of insulation materials exhibiting distinguished characteristics have been developed in recent years, and based on utilization of these insulation materials, further increase of capacity and further down-sizing and weight reduction have been promoted. For example, motor torque has drastically been improved since 1970 as a result of the introduction of H-level insulation subsequent to the utilization of polyimide resins exerting ultra-high resistance against heat as an insulation material.

Not only outstanding thermal resistant property, but stable mechanical and electrical characteristics in a wide range of temperatures are also demanded for those insulation materials cited above. Concretely, tensile strength relative to thermal degradation characteristic and dielectric breakdown strength relative to thermal degradation characteristic are respectively subject to evaluation. In addition, corona resistant characteristic is also demanded for insulation materials. In particular, corona resistant characteristic has more critically been considered in relation to introduction of alternate current for driving motors of electric trains in recent years.

Introduction of AC motors has been under study on the grounds that dimension can be contracted, compared with that of DC motors and the number of rotation can be increased to result in increased torque, and yet, maintenance can easily be performed. To compose insulated wires and coils, debut of such a film incorporating distinguished thermal resistant property, stable mechanical and electric characteristics, and distinguished corona resistant characteristic has been anticipated.

Polyimide film has proven to be satisfactory not only in thermal resistant property, but also in mechanical and electric characteristics, and thus, it can suitably be used as on insulation material of main motors. Nevertheless, polyimide film has not always proven to be satisfactory in corona resistant characteristic. Consequently, a variety of means have been executed to improve corona resistant characteristic of polyimide film.

In order to improve corona resistant characteristic of polyimide film, for example, a variety of methods such as adhesion of aggregate mica to polyimide film or dispersion of filler material such as mica, alumina or silica, in polyimide film have been implemented.

Nevertheless, because of the expensive cost of aggregate mica and the low reliability of adhesive agents used to adhere aggregate mica onto plastic film, and further, due to increased processing steps, production of such an insulation film comprising a plastic film adhered with aggregate mica results in the increased cost.

In the case of dispersing filler material in a plastic film, because of the complicated steps in changing kinds of filler in the process of producing film, product cost increases. Concretely, in the case of using polyimide film as a plastic film, for example, as shown in FIG. 9, the production process begins with synthesis and polymerization of varnish as a precursor of polyimide by conjunctionally feeding raw material of varnish and filler material to a reaction bath 1, and then, said varnish is led to an intermediate varnish tank 2, followed by a step of mixing said varnish from the intermediate tank 2 with reactive curing agent in a mixer 3 before eventually executing a film casting process, thus requiring very long processing steps. As was described above, since very long steps must be executed until reaching a final film casting process after synthesizing and polymerizing said varnish as a precursor of polyimide, whenever changing kind of filler to be added, tremendous mechanical loss arises from washing of facilities or the like. This in turn results in an increase in the cost of produced film to raise a critical problem in the case of using polyimide film as an insulation material.

Further, adding an increased amount of filler to the film results in improved corona resistant characteristic. However, this in turn raises such a problem as the mechanical strength of the film being lowered. Although addable amount varies to some extent depending on the kind of filler, in the case of adding alumina having mean particle size of scores of nm, the addable amount is limited to be about 20% by weight. In consequence, any conventional method which involves the addition of filler fails to drastically improve the corona resistant characteristic of film.

As preceding arts, Japanese Laid-Open Patent Publications SHO-50-665343 (1975) and HEI-4-122783 (1992) respectively proposed a method of improving the thermal radiative characteristic or corona resistant characteristic by providing a coated substance having 15~20 μm of thickness and satisfactory thermal radiative characteristic. Nevertheless, according to the thickness of the coated substance used for implementing the above arts, in the case of manufacturing tape-wrapped insulated wires or insulated coils by applying the above-described coated film, because of substantial thickness of the film, when the coated film is wound on each wire, overall size of the insulated wire or the insulated coil expands. Since it is essential from the viewpoint of facilitating design work that usable film be thinner and fully satisfactory in electric characteristics including corona resistant characteristic for use in the latest compact and high-output motors, practical use of the above-cited film remains quite difficult.

Accordingly, in order to fully solve the above referred problems by way of drastically improving the above preceding arts from the standpoint of the existing industrial demand, the inventors have achieved the present invention as a result of following up overall studies and experiments. Concretely, the inventors have consummated a novel film capable of sustaining proper mechanical strength and insulating characteristic of plastic film such as polyimide film which is base material for insulating material, where the novel film is provided with distinguished corona resistant characteristic without significantly varying proper thickness of the base material. Accordingly, by way of utilizing the novel film, it is possible to provide such a film material suited for materializing compact-size and high-output potential required for the latest insulation material at an inexpensive cost. Furthermore, the invention also provides improved insulated wires, insulated coils, and electric motors, respectively being capable of responding to recent demand for materializing higher running speed and higher accelerating/decelerating function of rolling stocks.

DISCLOSURE OF THE INVENTION

One embodiment of a film distinguished in corona resistant characteristic according to the present invention comprises an inorganic compound or inorganic substance having a minis of 2W/m·K of thermal conductivity laminated at least on a single surface of a base film thereof.

Especially in said film distinguished in corona resistant characteristic, the thermal conductivity of said inorganic compound or inorganic substance is desirably a minimum of 6W/m·K, preferably a minimum of 15W/m·K.

In said film distinguished in corona resistant characteristic, said inorganic compound or inorganic substance comprises any of metal oxide, metal nitride, metal carbide or metal silicide.

Further, another embodiment of a film distinguished in corona resistant characteristic according to the present invention comprises a base film having a maximum of $10^{13}$ Ω·cm of superficial electrical resistance and a minimum of $10^{14}$ Ω·cm of volume electrical resistivity at least on one surface thereof.

Another embodiment of a film distinguished in corona resistant characteristic according to the present invention comprises a base film having a low-electrical-resistance layer exhibiting a maximum of $10^{13}$ Ω·cm of superficial electrical resistance formed at least on one surface thereof and volume electrical resistivity yielded therefrom is a minimum of $10^{14}$ Ω·cm.

In said film distinguished in corona resistant characteristic said low-electrical-resistance layer is formed on a base film having an inorganic compound or inorganic substance laminated thereon.

Especially in said film distinguished in corona resistant characteristic, said superficial electrical resistance is desirably a maximum of $10^{12}$ Ω·cm. In addition said volume electrical resistivity is a minimum of $10^{15}$ Ω·cm.

In said film distinguished in corona resistant characteristic, said base film comprises polyimide film.

An embodiment of an insulated wire according to the present invention comprises a single electrical wire or a plurality of said wires being taped with said film distinguished in corona resistant characteristic.

An embodiment of a coil according to the present invention comprises that a plurality of said insulated wires are bundled together and said bundled insulated wires are taped with insulated material.

Further, an embodiment of an electric motor according to the present invention comprises fabricating said electric motor by utilizing said coils.

By way of laminating layers of inorganic compound or inorganic substance exerting high thermal conductivity at least on a single surface of a base film or by way of adjusting superficial electrical resistance and volume electrical resistivity at least on a single surface of the base film to a specific value, the invention restrains heat on the film surface from being accumulated and improves corona resistant characteristic without the mechanical strength of film being lowered.

Generally, it is conceived that degradation of corona generated in a film (an insulation material) can be promoted by three kinds of mechanism including chain reaction of radicals generated by collision between electrons and ions, degradation via oxidation caused by ozone generated by corona, and thermal degradation caused by Joule heat. Accordingly, the inventors have conceived of the possibility to improve the corona resistant characteristic of the film by restraining the heat on the film surface from being accumulated.

Concretely, as a means for restraining heat on the film surface from being accumulated, the invention restrains heat generated thereon from being accumulated by way of promoting thermal conductivity on the film surface via lamination of inorganic compound or inorganic substance exerting high thermal conductivity as highly effective thermal conductive layers at least on a single surface of the base film. Furthermore, as another means for restraining heat on the film surface from being accumulated, by way of adjusting superficial electrical resistance and volume electrical resistivity on the film surface to a specific value, the invention restrains heat on the film surface from being accumulated by preventing heat from being generated via collision of discharged electrons and ions against film surface without causing the film to lose its function as an insulation material. By virtue of suppressed thermal accumulation on the film surface, it is not only possible to restrain the film from thermally being degraded, but it is also possible to retard promotion of reaction otherwise causing corona degradation to occur via chain reaction of radicals and degradation of the film to occur via oxidation, thus effectively improving corona resistant characteristic of the film.

It is desired that a usable inorganic compound or inorganic substance exerting high thermal conductivity be selected particularly from any of metal oxide, nitride, carbide, or silicide. Any of the inorganic compounds or inorganic substances cited above exerts satisfactory adhesion onto the film and can easily be laminated thereon at an inexpensive cost, and yet, it is possible to produce such a film exhibiting distinctly outstanding corona resistant characteristic.

In order to properly adjust superficial electrical resistance and volume electrical resistivity on the film surface to a specific value, the film surface may directly be reformed to bear low electrical resistance. However, it is desired that low electrical resistance layers bearing negligible superficial electrical resistance be formed at least on a single surface of a film. Said low electrical resistance layers can be formed by laminating an inorganic compound or inorganic substance on the film. It is desired that the superficial electrical resistance value of the low electrical resistance layers to be formed on the film surface be in a range from $10^3$ to $10^{13}$ $\Omega \cdot cm$. In order to enable the film to function as an insulation material, it is essential that volume electrical resistivity be a minimum of $10^{14}$ $\Omega \cdot cm$. Superficial electrical resistance and volume electrical resistivity on the film surface can be adjusted to the above-defined values by properly adjusting thickness and kind of low electrical resistance layers.

From the viewpoint of cost, it is conceived that adhesion via evaporation including vacuum evaporation such as electron-beam heating or ion plating, sputtering, or adhesion via plating method, is optimal for laminating an inorganic compound or inorganic substance to generate high thermal conductive layers and low electrical resistance layers at least on a single surface of a film. Accordingly, by way of laminating an inorganic compound or inorganic substance at least on a single surface of a film by applying evaporation adhesion or plating, corona resistant characteristic of the film can be improved at an inexpensive cost. In the case of using electrically conductive paint for composing a low electrical resistance layer on the film surface, in order to improve corona resistant characteristic, it is essential that the thickness of the electrically conductive layer be more than scores of μm.

The inventive film featuring distinct corona resistant characteristic produced by implementing the above processes preserves proper mechanical strength of the base film without degradation at all. Accordingly, the invention is applicable to all films by way of improving corona resistant characteristic. In particular, by applying the invention to an insulation film which used polyimide film as the base, such a reliable film featuring distinguished thermal resistant property, mechanical strength, and electrical characteristic ideally suited for serving as insulation material in the structure of main motors can be produced. According to conventional method of improving corona resistant characteristic of polyimide film, production cost of such an insulation film remains quite expensive to result in a critical problem. However, production cost can drastically be decreased by implementing the invention.

Owing to the above described structure, the invention provides such a novel film incorporating distinguished corona resistant characteristic without lowering proper mechanical strength of film. Accordingly, insulated wires and coils produced by applying the film featuring distinguished corona resistant characteristic are suited for making up parts of motors such as AC motors for which corona resistant characteristic is particularly required. By applying the inventive coils, motors, particularly those for being mounted on electric trains and vehicles, can be provided with a significantly increased capacity, down-sized dimension, and lighter weight.

BRIEF DESCRIPTION OF THE DRAWINGS

FIGS. 3(a) and 3(b) are explanatory of exemplified uses of the inventive film incorporating distinguished corona resistant characteristic; wherein FIG. 3(a) is an enlarged sectional view of an exemplified film for taping an electric wire incorporating distinguished corona resistant characteristic; and FIG. 3(b) is an enlarged perspective view for explanation of processes for manufacturing insulated wires related to the invention;

OPTIMAL FORM FOR EMBODYING THE INVENTION

Referring now to the accompanying drawings, practical examples of a novel film distinguished in corona resistant characteristic related to the invention, an insulated wire, an insulated coil, and a motor, respectively using insulation material comprising said inventive film, are described below.

Figure 1:
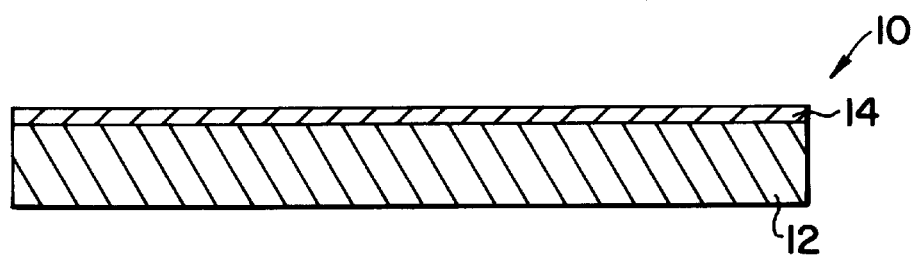
FIGS. 1 and 2 are respectively enlarged sectional views for explanation of an exemplified film distinguished in corona resistant characteristic related to the invention.

FIG. 1 exemplifies an example of novel film distinguished in corona resistant characteristic related to the invention, in which a high thermal conductive layer 14 is formed on a single surface of a base film 12 of a film structure 10 so that heat can be restrained from being accumulated on the film surface. The thermal conductive layer 14 is formed by laminating inorganic compound or inorganic substance containing a minimum of $2W/m \cdot K$ of thermal conductivity. It is preferred that the thermal conductivity of said inorganic compound or inorganic substance be a minimum of $6W/m \cdot K$, and yet, it is further preferred that the thermal conductivity of said inorganic compound or inorganic substance be a minimum of $15W/m \cdot K$. As a result of forming the high thermal conductive layer 14 on the surface of the base film 12 by laminating the inorganic compound or inorganic substance containing substantial thermal conductivity as specified above, thermal conductivity on the surface of the film 10 is promoted to enable heat which is apt to be accumulated on the film surface to quickly and conductively be discharged, thus improving corona resistant characteristic.

Figure 2:
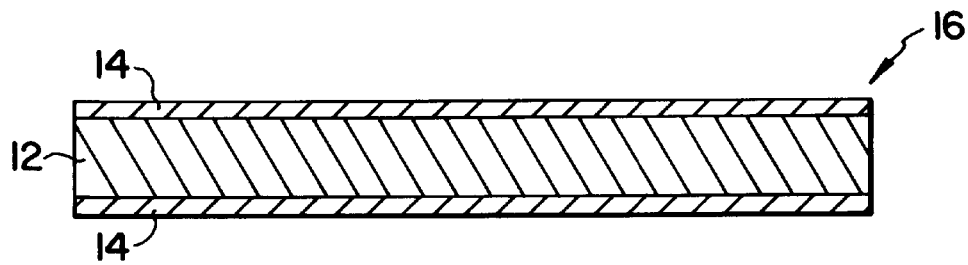

In addition, as shown in FIG. 2, it is also allowable to form such a film 16 having bilateral thermal conductive layers 14 on both surfaces of the base film 12. The film 16 exerts more distinct corona resistant characteristic than that of the film 10 having a single thermal conductive layer 14 formed on a single surface of the base film 12.

Inorganic compounds containing substantial thermal conductivity are exemplified by boron nitride, aluminium nitride, silicon nitride, zirconium nitride, calcium oxide, aluminium oxide, magnesium oxide, beryllium oxide, titanium oxide, zirconium oxide, thorium oxide, titanium carbide, silicon carbide, molybdenum silicide, or the like. When the laminate is formed, any of those inorganic compounds may be used individually or in mixture with "Murait" ($3Al_2O_3 \cdot 2SiO_2$) or "Spinnel" ($MgO \cdot Al_2O_3$), or in mixture with several kinds of inorganic compounds. Not only the above-cited compounds, but any of those inorganic compounds or inorganic materials containing substantial thermal conductivity such as metal oxide, metal nitride, metal carbide, or metal silicide, may also be used.

There is no restriction on the method of forming the high thermal conductive layer on a single surface or both surfaces of the film. However, from the viewpoint of production cost, adhesion via evaporation including vacuum evaporation such as electron-beam heating method or ion-plating method or sputtering, or adhesion via plating method is suited for application thereto. By laminating the above-cited inorganic compound on a single surface or both surfaces of the film by executing evaporation-adhesion method, either the novel film 10 or the novel film 16 respectively exerting distinguished corona resistant characteristic related to the invention shown in FIG. 1 or 2 can be produced.

As another aspect of the inventive film distinguished in corona resistant characteristic, the film may be so arranged that superficial electrical resistance at least on one surface thereof remains at a maximum of $10^{13}$ Ω·cm, whereas volume electrical resistivity remains at a minimum of $10^{14}$ Ω·cm. By referring to FIG. 1 for example, a practical method of adjusting superficial electrical resistance and volume electrical resistivity to the above-defined values is described below. Initially, a low electrical resistant layer 14 is formed on one surface of the base film 12, where the layer 14 designates superficial electrical resistance as per the above-defined value, and then, the thickness of the low electrical resistant layer 14 formed on the surface of the film is arranged so that the volume electrical resistivity can be or exceed $10^{14}$ Ω·cm. In the case of the inventive film 10, it is desired that the superficial electrical resistance value of the low electrical resistant layer 14 formed on the film surface be in a range from $10^3$ to $10^{13}$ Ω·cm. If the superficial electrical resistance value were too low, corona resistant characteristic of the film is lowered. In order to have the film function itself as an insulation material, it is essential that volume electrical resistivity be or exceed $10^{14}$ Ω·cm. Preferably, it is desired that the superficial electrical resistance be a maximum of $10^{12}$ Ω·cm, whereas the volume electrical resistivity be a minimum of $10^{15}$ Ω·cm. By properly adjusting both to the defined values, the novel film distinguished in corona resistant characteristic can be produced.

The invention also provides a novel film 16 shown in FIG. 2 having bilateral low electrical resistance layers 14 laminated horizontally on both surfaces of the base film 12.

When implementing the inventive method for forming the low electrical resistance layer 14, as was described earlier, from the viewpoint of production cost, adhesion via evaporation including vacuum evaporation such as electron-beam heating method or ion-plating method, or sputtering method, or adhesion via plating method, are most suited. Those inorganic compounds or inorganic substance exemplified below can be used for composing the low electrical resistance layer 14 which can be laminated via evaporation adhesion method. The are, for example, silicon monoxide, silicon dioxide, beryllium oxide, calcium oxide, titanium oxide, aluminium, silver, gold, nickel, titanium, chrome, platinum, white gold or an alloy comprising nickel-chrome, copper-zinc or SUS, etc. Nevertheless, when laminating metals such as aluminium or silver, the superficial electrical resistance value is apt to be lowered, and thus, in order to improve corona resistant characteristic by assuming that superficial electrical resistance value is $10^3$ Ω·cm, applicable condition for implementing evaporation adhesion must be devised, and thus, from the standpoint of this need, use of inorganic compound is preferred. It should be noted that, among the above-cited inorganic compounds, silicon oxide (SiOx) has proven to be most effective in the improvement of corona resistant characteristic, and yet, evaporation adhesion process can be executed at an inexpensive cost. Value of x shown in SiOx is in a range from 1.1 to 1.9. By laminating any of the above-cited inorganic compounds or inorganic substances on one surface or both surfaces of the base film via evaporation adhesion method, the inventive film 10 shown in FIG. 1 or the inventive film 16 shown in FIG. 2 can be produced. It is possible to laminate thinly formed low electrical resistance layers by laminating any of the above-cited inorganic compounds or inorganic substances on one surface or both surfaces of the base film via evaporation adhesion method.

In order to form the low electrical resistance layers 14 according to the invention, it is desired that any of the above-cited inorganic compounds or inorganic substances which can be laminated on the film surface via evaporation adhesion be used. However, instead of these, electrically conductive paint, for example, may also be used.

The invention does not restrict thickness of the above-referred high thermal conductive layer or the low electrical resistance layer 14, but thickness can properly be determined within a scope enabling the film to function itself as an insulation material depending on the kind of inorganic compound or inorganic substance to be laminated for making up the high thermal conductive layer or the low electrical resistance layer 14. For example, when the high thermal conductive layer 14 is formed from a laminate of inorganic compound exerting high thermal conductivity with a thickness ranging from several hundred angstrom (Å) to several thousand angstrom (Å), the formed layer 14 exhibits corona resistant characteristic being approximately double or more than double the rating of conventional film. The greater the thermal conductivity of the used inorganic compound and the thicker the layer thickness, the higher the resultant corona resistant characteristic of the produced film. It was also proven that when the low electrical resistance layer 14 comprising a laminate of silicon dioxide formed on one surface of a polyimide film had 1000 Å of thickness, the completed film exhibited $1.2 \times 10^{11}$ Ω·cm of superficial electrical resistance value and $1.3 \times 10^{16}$ Ω·cm of volume electrical resistivity. Accordingly, the completed inventive film exhibited outstanding corona resistant characteristic about 1.5 times through 2 times higher than that shown by conventional films. As is apparent from the above description, by way of forming a thin film from inorganic compound via evaporation adhesion, even though it has extremely thin thickness ranging from several hundred angstrom (Å) to several thousand angstrom (Å), corona resistant characteristic can be improved to full extent.

Although all kinds of plastic film can be used for making up the base film 12, in particular, it is desired that polyimide film be used therefor. This is because, since polyimide film not only exhibits distinguished thermal resistant characteristic, but it also exhibits stable mechanical strength and electric characteristic against temperature in an extensive range, by way of solely improving corona resistant characteristic, polyimide film can be converted into an extremely reliable insulation material.

The inventive film exhibiting distinguished corona resistant characteristic produced via the above-described processes is by far superior to unprocessed films in the corona resistant characteristic. In particular, in the case of using polyimide film for the base film, not only being distinguished in corona resistant characteristic, but it also conjunctionally incorporates outstanding thermal resistant characteristic, extremely stable mechanical strength and electric characteristic proper to polyimide film, and yet, since polyimide film can be provided at an inexpensive cost, polyimide film is preferably used for insulation material for which corona resistant characteristic has lately been demanded.

Figure 3A:
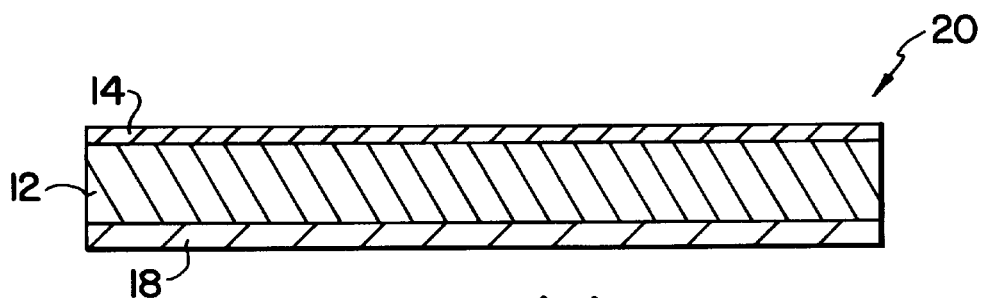
Figure 3B:
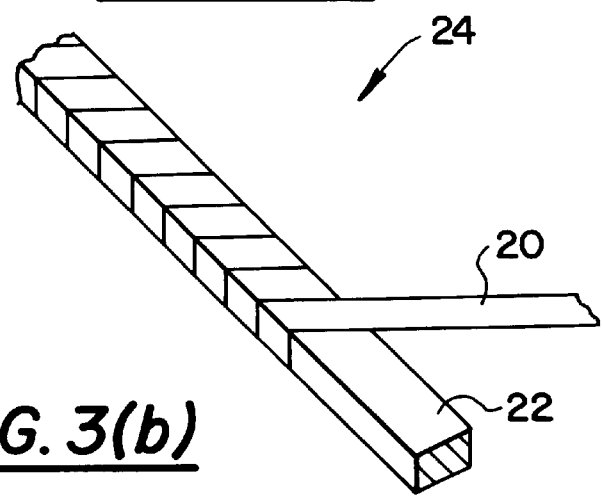

In the case of using the inventive film 10 distinguished in corona resistant characteristic for insulation material, for example, as shown in FIG. 3(a), it is also practicable to initially form a taping-use film 20 by forming an adhesive agent layer 18 comprising fluorocarbon resin, or the like, and then, as shown in FIG. 3(b), the taping-use film 20 is wound on the periphery of a piece of straight-angular-form copper wire 22 for example to produce an insulated wire 24 by externally disposing a surface having a high thermal conductive layer or a low electrical resistance layer 14 formed thereon.

When producing such a taping-use film 20, adhesive agent layer 18 may be composed of a layer of fluorocarbon resin, or a layer of epoxy resin, or a layer of silicone resin, or a layer of polyimide resin. Like the base film 12, it is desired that adhesive agent layer 18 conjunctionally incorporates thermal resistant property, mechanical and electrical characteristics, and yet, it is particularly desired that the adhesive agent layer 18 be distinguished in insulation characteristic.

Figure 4:
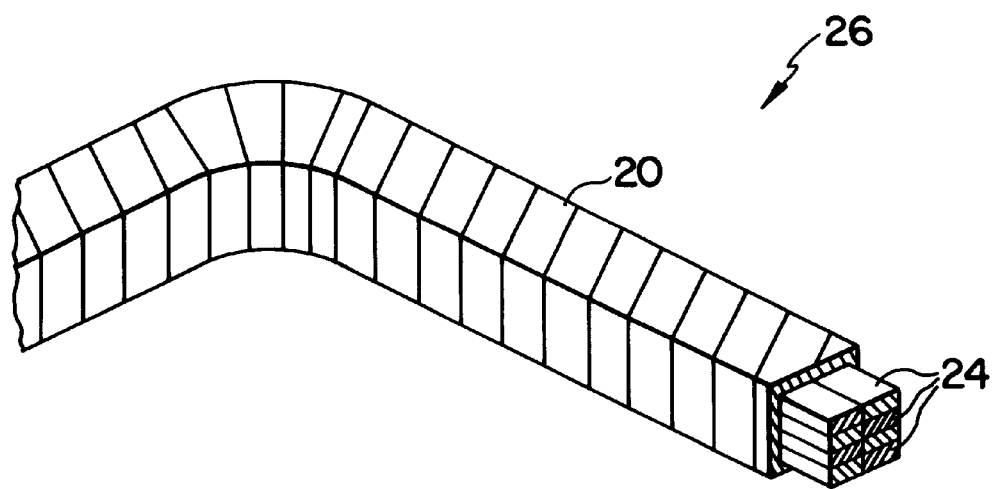
FIG. 4 is an enlarged perspective view for explanation of an exemplified coil related to the invention.

In addition, as shown in FIG. 4, it is also possible to make use of a plurality of the inventive insulated wires 24 in a bundle for fabricating a coil 26 by taping the bundled wires 24 with the taping-use film 20 described above. In this case, it is desired that the film 20 be wound on the periphery of copper wires 22 without generating recessed and projected portions in order that no interspace can be generated between the bundled insulated wires 24. If a recessed or projected portion were present, it is desired that the surface be properly processed.

As shown in FIG. 4, the coil 26 may be taped with the inventive taping film 20. However, insofar as the insulated wires incorporate distinguished corona resistant characteristic according to the invention, conventional insulation material may be used for covering the outmost surface of the coil 26.

The novel insulated wires and coils produced via the inventive method respectively exhibit distinguished corona resistant characteristic, which can suitably be used for component parts of high-voltage operated motors mounted on electric trains, for example, requiring reliable corona resistant characteristic.

When performing an insulation process after storing coils in a slot, insulating varnish is used. Usable insulating varnish includes epoxy resin, silicone resin, or polyimide resin, etc. Since the process for insulating coils by applying varnish gravely affects characteristics of motors, it is essential that the varnish to be used is also distinguished in corona resistant characteristic, and thus, a variety of fillers are subject to testing for addition to varnish and preliminary treatment prior to applying the varnish.

The inventive film distinguished in corona resistant characteristic and insulated wires, coils, and motors which respectively used the inventive film have thus been described by referring to practical examples. It should be understood, however that the scope of the invention is not solely limited to the above described examples. For example, the inventive film 10 may also be structured by putting metallic ion, for example, onto a single surface or both surfaces of the base film 12 as a means for adjusting superficial electrical resistance and volume electrical resistivity of the film so that predetermined superficial electrical resistance and volume electrical resistivity can be generated.

It is also practicable to compose such a film structure by way of laminating a high thermal conductive layer 14 and a low electrical resistance layer 14 to make up a double layer. Lamination may be implemented after mixing an inorganic compound or inorganic substance which is used for formation of said layers. Alternatively, the film 10 may be structured by way of laminating the high thermal conductive layer 14 and the low electrical resistance layer 14 on both surfaces of the base film 12.

Insofar as polyimide film as the base film is thermally adhesive, in the case of fabricating insulated wires and coils, as was described earlier, it is also possible to make use of the inventive film 10 distinguished in corona resistant characteristic to serve as a taping-use film without forming the adhesive agent layer 18.

Figure 5:
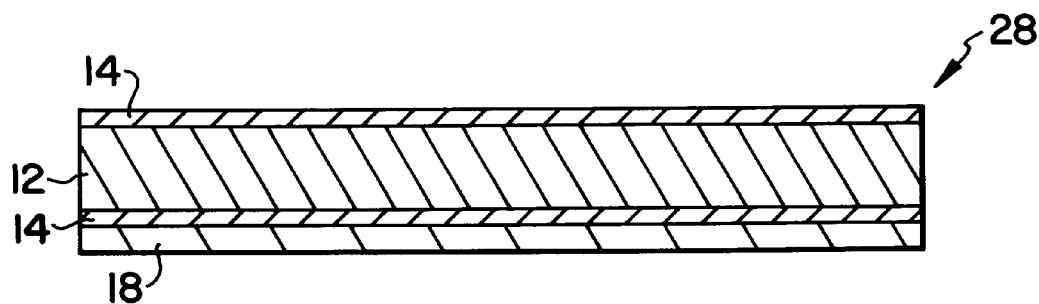
FIGS. 5 and 6 are respectively enlarged sectional views for explanation of another exemplification of a film for taping an electric wire produced by applying the inventive film distinguished in corona resistant characteristic.

Furthermore, in the case of taping the periphery of bundled insulated wires as was done for fabricating the coil shown in FIG. 4, as shown in FIG. 5, it is also allowable to use a taping-use film 28 comprising a film 16 distinguished in corona resistant characteristic and having a high thermal conductive layer or a low electrical resistance layer 14 formed on both surfaces and an adhesive agent layer 18 formed on a single surface thereof.

Figure 6:
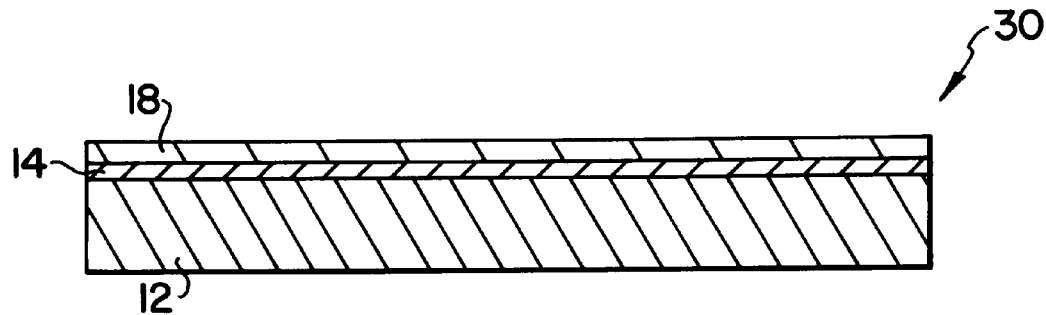

Furthermore, it is also practicable to fabricate a taping-use film 30 having an adhesive agent layer 18 formed on a surface having a high thermal conductive layer or a low electrical resistance layer 14 formed thereon as shown in FIG. 6, and then execute taping by internally disposing the high thermal conductive layer or the low electrical resistance layer 14 in the course of fabricating the above described insulated wires or coils.

Furthermore, it is also practicable to fabricate insulated wires by applying circular copper wires or form insulated wires by taping bundled copper wires with the inventive film 10. In place of copper wires, insulated electric wires may comprise another material such as superconductive material, for example. The invention can be implemented by way of adding a variety of improvements, changes, and modifications, based on knowledges of those skilled in the art within a scope without deviating from the essentials of the invention.

Based on the following Examples, the invention is concretely described below. It should be understood however that the scope of the invention is not solely limited to the following Examples.

EXAMPLE 1

Figure 7:
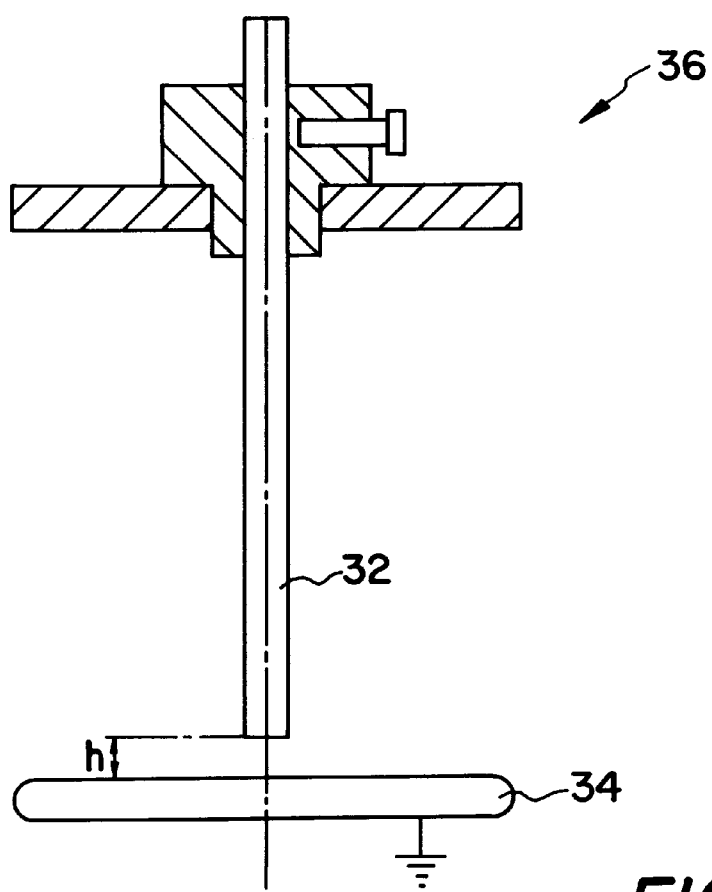
FIG. 7 is explanatory of a measuring apparatus for evaluating corona resistant characteristic.
Figure 8:
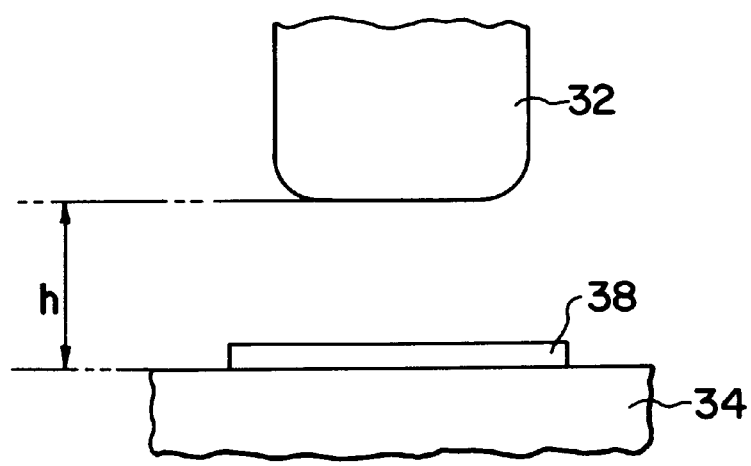
FIG. 8 is an enlarged view of part of the measuring apparatus shown in FIG. 7 showing intermediate portion between electrodes.
Figure 9:
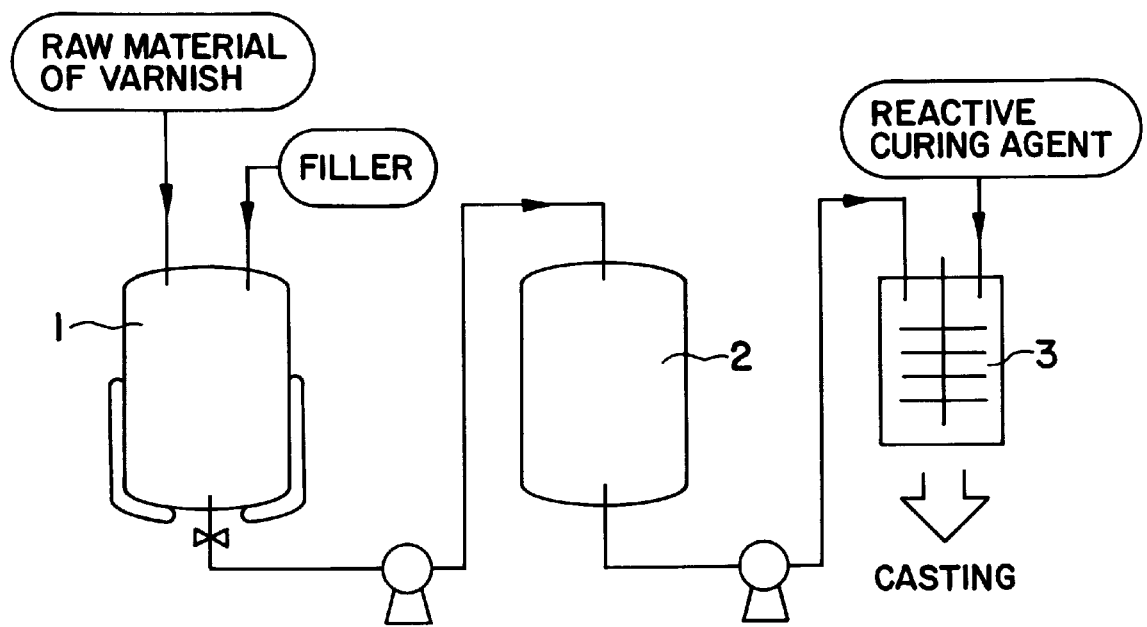
FIG. 9 is explanatory of steps for producing novel polyimide film incorporating corona resistant characteristic improved from conventional corona resistant characteristic.

Initially, a high thermal conductive layer was formed on a single surface of a polyimide film "APICAL" 25AH (a product and a registered trade name of Kanegafuchi Chemical Industrial Co., Ltd.) by laminating magnesium oxide by 1000 angstrom (Å) of thickness by applying a vacuum evaporation method via heating of electron beams to complete formation of a novel film distinguished in corona resistant characteristic according to the invention. Magnesium oxide exhibited 36.2W/m·K of thermal conductivity at 373K. Next, in accordance with the method prescribed by AM-D-2275, corona resistant characteristic of the produced film was evaluated. Concretely, as shown in FIG. 7 and FIG. 8, a test apparatus 36 incorporating an upper electrode 32 and a lower electrode 34 being disposed at about several hundred microns ($\mu$m) of interval h was operated. A sample film 38 was placed on the lower electrode 34, and then, corona resistant characteristic of the film 38 was evaluated by counting time (minute) until the tested film 38 was eventually broken after feeding optionally selected frequencies and voltages between both electrodes.

More particularly, as the test apparatus 36, a Model SD-12 dielectric strength tester (a product of Toshiba Corporation)

was used. The tester incorporates the upper electrode 32 made of cylindrically formed brass having 25.4 mm of diameter and 25 mm of length and having edges cut into 2.5 mmR and the lower electrode 34 made of cylindrically formed brass having 75 mm of diameter and 25 mm of length. Interval h between both electrodes was spaced by 0.3 mm. The test was carried out in an atmosphere of 23°±1° C. and 60%±5%RH by impressing 1600 V (60 Hz) of AC voltage by way of counting time until dielectric breakdown occurred. Test results are shown in Table 1 in conjunction with thermal conductivity of inorganic compounds.

TABLE 1

|  | Thermal Conductivity (W/m.k) | Condition of Formed Layer | Corona Resistant Characteristic (minute) |
|---|---|---|---|
| Example |  |  |  |
| 1 | 36.2 | Single surface/1000 Å | 150 |
| 2 | 18.0 | Single surface/1000 Å | 95 |
| 3 | 18.0 | Single surface/2000 Å | 110 |
| 4 | 18.0 | Double surfaces/1000 Å each | 134 |
| 5 | 15.3 | Single surface/1000 Å | 90 |
| 6 | 6.5 | Single surface/1000 Å | 78 |
| 7 | 2.0 | Single surface/1000 Å | 70 |
| Comp. Example |  |  |  |
| 1 | — | — | 40 |
| 2 | 18.0 | 5 μm | 50 |
| 3 | 18.0 | 15 μm | 70 |

EXAMPLE 2

Except for the introduction of aluminium oxide as inorganic compound used for forming a high thermal conductive layer, in the same way as done for Example 1, a novel inventive film distinguished in corona resistant characteristic was produced. Aluminum oxide exhibited 18.0W/m·K of thermal conductivity at 373K. In the same way as was done for Example 1, corona resistant characteristic of the produced film was evaluated. Test results are also shown in Table 1 in conjunction with thermal conductivity of inorganic compound.

EXAMPLE 3

Except for 2000 Å of the thickness provided for the high thermal conductive layer, in the same way as was done for Example 2, a novel inventive film distinguished in corona resistant characteristic was produced. In the same way as was done for Example 1, corona resistant characteristic of the produced film was evaluated. Test results are also shown in Table 1.

EXAMPLE 4

Except for formation of the high thermal conductive layer on both surfaces of a film, in the same way as was done for Example 2, a novel inventive film distinguished in corona resistant characteristic was produced. In the same way as was done for Example 1, corona resistant characteristic of the produced film was evaluated. Test results are also shown in Table 1.

EXAMPLE 5

Except for the introduction of calcium oxide as the inorganic compound used for forming a high thermal conductive layer, in the same way as was done for Example 1, a novel inventive film distinguished in corona resistant characteristic was produced. Aluminium oxide exhibited 15.3W/m·K of thermal conductivity at 373K. In the same way as was done for Example 1, corona resistant characteristic of the produced film was evaluated. Test results are also shown in Table 1 in conjunction with thermal conductivity of inorganic compound.

EXAMPLE 6

Except for the introduction of titania as the inorganic compound used for forming a high thermal conductive layer, in the same way as was done for Example 1, a novel inventive film distinguished in corona resistant characteristic was produced. Titania exhibited 6.5W/m·K of thermal conductivity at 373K. In the same way as was done for Example 1, corona resistant characteristic of the produced film was evaluated. Test results are also shown in Table 1 in conjunction with thermal conductivity of inorganic compound.

EXAMPLE 7

Except for the introduction of zirconia as the inorganic compound used for forming a high thermal conductive layer, in the same way as was done for Example 1, a novel inventive film distinguished in corona resistant characteristic was produced. Zirconia exhibited 2.0W/m·K of thermal conductivity at 373K. In the same way as was done for Example 1, corona resistant characteristic of the produced film was evaluated. Test results are also shown in Table 1 in conjunction with the thermal conductivity of inorganic compound.

EXAMPLE 8

Initially, a low electrical resistance layer was formed on a single surface of a polyimide film "APICAL" 25AH (a product and a registered trade name of Kanegafuchi Chemical Industrial Co., Ltd.) by laminating silicon dioxide having a thickness of 1000 Å thereon via vacuum evaporation method by means of heating electron beams, and then, a novel inventive film distinguished in corona resistant characteristic was produced. In the same way as was done for Example 1, corona resistant characteristic of the produced film was evaluated. In addition, in accordance with ASTM-D-257, superficial electrical resistance (Ω·cm) and volume electrical resistivity (Ω·cm) of the produced film were respectively measured. Test results are shown in Table 2.

TABLE 2

|  | Corona Resistant Characteristic (minute) | Superficial Electrical Resistance (Ω.cm) | Volume Electrical Resistance (Ω.cm) |
|---|---|---|---|
| Example |  |  |  |
| 8 | 80 | $1.2 \times 10^{11}$ | $1.3 \times 10^{16}$ |
| 9 | 220 | $1.4 \times 10^{11}$ | $9.0 \times 10^{15}$ |
| 10 | 90 | $2.5 \times 10^{12}$ | $7.0 \times 10^{15}$ |
| 11 | 120 | $2.5 \times 10^{12}$ | $7.0 \times 10^{15}$ |
| 12 | 150 | $2.5 \times 10^{12}$ | $7.0 \times 10^{15}$ |
| Comp. Example |  |  |  |
| 1 | 40 | $5.0 \times 10^{16}$ | $7.0 \times 10^{16}$ |
| 4 | 0 | 100 | $1.5 \times 10^{13}$ |

EXAMPLE 9

On double surfaces of a polyimide film "APICAL" 25AH (a product and a registered trade name of Kanegafuchi Chemical Industrial Co., Ltd.) by formed laminating silicon dioxide having a thickness of 1000 Å thereon as shown in Example 1, a novel inventive film distinguished in corona resistant characteristic was produced. In the same way as was done for Example 8, corona resistant characteristic of the produced film was evaluated. In addition, superficial electrical resistance and volume electrical resistivity of the produced film were respectively measured. Test results are shown in Table 2.

EXAMPLE 10

On a single surface of a polyimide film "APICAL" 25AH by laminating silicon oxide having a thickness of 200 Å thereon as shown in Example 1, corona resistant characteristic was evaluated in the same way as was done for Example 8, and superficial electrical resistance and volume electrical resistivity were respectively measured. Test results are shown in Table 2.

EXAMPLE 11

On a single surface of a polyimide film "APICAL" 25AH formed by laminating silicon oxide having a thickness of 1000 Å thereon as shown in Example 1, corona resistant characteristic was evaluated in the same way as was done for Example 8, and superficial electrical resistance and volume electrical resistivity were respectively measured. Test results are shown in Table 2.

EXAMPLE 12

On a single surface of a polyimide film "APICAL" 25AH formed by laminating silicon oxide having a thickness of 2000 Å thereon as shown in Example 1, corona resistant characteristic was evaluated in the same way as was done for Example 8, and superficial electrical resistance and volume electrical resistivity were respectively measured. Test results are shown in Table 2.

Comparative Example 1

In the same way as was done for Example 8, corona resistant characteristic, superficial electrical resistance, and volume electrical resistivity of polyimide film "APICAL" 25AH (a product and a registered trade name of Kanegafuchi Chemical Industrial Co., Ltd.) were respectivly measured. Test results are shown in Tables 1 and 2.

Comparative Example 2

By applying thermally conductive paint composed of linealy copolymerized polyester resin containing 40 parts of alumina having several microns ($\mu$m) of mean particle size dispersed therein onto the above-identified polyimide film "APICAL" 25AH via coating, a 5 $\mu$m thick laminate layer was produced. In the same way as was done for Example 1, corona resistant characteristic of the laminate layer was evaluated. Test result is shown in Table 1.

Comparative Example 3

By applying thermally conductive paint composed of linearly copolymerized polyester resin containing 40 parts of alumina having several microns ($\mu$m) of mean particle size dispersed therein onto the above-identified polyimide film "APICAL" 25AH via coating, a 15 $\mu$m thick laminate layer was produced. In the same way as was done for Example 1, corona resistant characteristic of the laminate layer was evaluated. The test result is shown in Table 1.

Comparative Example 4

On a single surface of a polyimide film "APICAL" 25AH by laminating aluminium having a thickness of 1000 Å thereon as shown in Example 1, corona resistant characteristic was evaluated in the same way as was done for Example 8, and superficial electrical resistance and volume electrical resistivity were respectively measured. Test results are shown in Table 2.

INDUSTRIAL APPLICABILITY

The inventive film distinguished in corona resistant characteristic conjunctionally incorporates superb thermal resistant property, mechanical and electrical characteristics, and outstanding corona resistant characteristic. Accordingly, the inventive film is optimal as an insulation material for component parts of motors such as insulated wires and coils. In particular, insulated wires and coils comprising the inventive films as insulation materials are ideally suited for component parts of motors such as AC motors requiring reliable corona resistant characteristic. Thus, by utilizing such coils it is possible to significantly expand capacity, contract dimension, and decrease weight of motors, particularly those mounted on electric trains. At the same time, it is possible to provide reliable motors that can securely respond to the demand for achieving faster running speed and faster response in acceleration and deceleration of running speed of modern electric trains.

What is claimed is:

1. A corona-resistant film comprising a polyimide base layer and one or more thermally conductive layers laminated horizontally on one or both surfaces of said polyimide base layer by an evaporation or plating, said thermally conductive layers having a thickness of 2000 Å or less and a minimum thermal conductivity of 2 W/m·K and consisting of at least one inorganic compound or inorganic material selected from the group consisting of metal nitrides, metal carbides, metal silicides, metal oxides and $SiO_x$.

2. A corona-resistant film comprising a polyimide base layer and one or more thermally conductive layers laminated horizontally on one or both surfaces of said polyimide base layer by an evaporation or plating, said thermally conductive layers having a thickness of 2000 Å or less and a minimum thermal conductivity of 2 W/m·K and consisting of at least one inorganic compound or inorganic material selected from the group consisting of metal carbides, metal silicides, metal oxides and $SiO_x$.

3. A corona-resistant film according to claim 1 or 2, wherein said minimum thermal conductivity of said inorganic compound or inorganic material is 6 W/m·K.

4. A corona-resistant film according to claim 1 or 2, wherein said minimum thermal conductivity of said inorganic compound or inorganic material is 15 W/m·K.

5. A corona-resistant film according to claim 1 or 2, wherein said inorganic compound or inorganic material is at least one member selected from the group consisting of calcium oxide, aluminum oxide, magnesium oxide, beryllium oxide, titanium oxide, zirconium oxide, thorium oxide, and $SiO_x$.

6. A corona-resistant film according to claim 1 or 2, wherein said inorganic compound or inorganic material is $SiO_x$ and wherein x is in a range of from 1.1 to 1.9.

7. A corona-resistant film according to claim 1 or 2, wherein said inorganic compound or inorganic material is silicon dioxide.

8. A corona-resistant film according to claim 1 or 2, wherein said thermally conductive layers are laminated by electron beam heating or ion plating sputtering.

9. An insulated wire comprising a single electrical wire or a plurality of electrical wires taped with said film of claim 1 or 2.

10. A coil comprising a plurality of said insulated wires of claim 9 bundled together, wherein said bundled insulated wires are taped with insulated material.

11. An electric motor comprising a plurality of said coils of claim 10.

12. A corona-resistant film with a minimum electrical resistivity of $10^{14}$ $\Omega$·cm comprising a polyimide base layer and one or more low-electrical-resistant layers laminated horizontally on one or both surfaces of said polyimide base layer by an evaporation or plating, said low-electrical-resistant layer having a thickness of 2000 Å or less and a maximum superficial electrical resistance of $10^{13}$ $\Omega$ and consisting of at least one inorganic compound or inorganic material selected from the group consisting of metal nitrides, metal carbides, metal silicides, metal oxides and $SiO_x$.

13. A corona-resistant film with a minimum electrical resistivity of $10^{14}$ $\Omega$·cm comprising a polyimide base layer and one or more low-electrical-resistant layers laminated horizontally on one or both surfaces of said polyimide base layer by an evaporation or plating, said low-electrical-resistant layer having a thickness of 2000 Å or less and a maximum superficial electrical resistance of $10^{13}$ $\Omega$ and consisting of at least one inorganic compound or inorganic material selected from the group consisting of metal carbides, metal suicides, metal oxides and $SiO_x$.

14. A corona-resistant film according to claim 12 or 13, wherein said low-electrical-resistance layer has a maximum superficial electrical resistance is $10^{12}$ $\Omega$.

15. A corona-resistant film according to claim 12 or 13, wherein said low-electrical-resistance layer has a minimum volume electrical resistivity is $10^{15}$ $\Omega$·cm.

16. A corona-resistant film according to claim 12 or 13, wherein said inorganic compound or inorganic material is at least one member selected from the group consisting of calcium oxide, aluminum oxide, magnesium oxide, beryllium oxide, titanium oxide, zirconium oxide, thorium oxide, and $SiO_x$.

17. A corona-resistant film according to claim 12 or 13, wherein said inorganic compound or inorganic material is $SiO_x$, and wherein x is in a range of from 1.1 to 1.9.

18. A corona-resistant film according to claim 12 or 13, wherein said inorganic compound or inorganic material is silicon dioxide.

19. A corona-resistant film according to claim 12 or 13, wherein said low-electrical-resistance layers are laminated by electron beam heating or ion plating sputtering.

20. An insulated wire comprising a single electrical wire or a plurality of electrical wires taped with said film of claim 12 or 13.

21. A coil comprising a plurality of said insulated wires of claim 20 bundled together, wherein said bundled insulated wires are taped with insulated material.

22. An electric motor comprising a plurality of said coils of claim 21.

* * * * *